United States Patent Office 3,778,492
Patented Dec. 11, 1973

3,778,492
FABRICATION OF THREE-DIMENSIONAL REINFORCED FOAM INSULATION BLOCKS
Carl Robert Lemons, Westminster, Calif., assignor to McDonnell Douglas Corporation
Filed Apr. 3, 1972, Ser. No. 240,524
Int. Cl. B29d 27/04
U.S. Cl. 264—45
4 Claims

ABSTRACT OF THE DISCLOSURE

A method of making three-dimensional reinforced foam insulation blocks wherein an X, Y, Z grid is made of the reinforcement fibers through which the insulative foam expands in the fabrication process. The placement of Z fibers through the multiple layers of the X-Y grid fibers utilizes a tube array for guidance. Frames for the X-Y fibers form a disposable mold to contain the foam while it expands and cures.

BACKGROUND OF THE PRESENT INVENTION

A three-dimensional reinforced structure is described in Pat. No. 3,322,868 which issued May 30, 1967 to Kruse and Rossello and which is assigned to a common assignee. That structure and the structure made in accordance with the present invention are similar in structure and function but differ in their method of fabrication. The Kruse patent teaches of a plurality of frames having a one-dimensional pattern of fibers or strands stacked so that the orientation of the strands on adjacent frames is perpendicular and thereafter strands of threads are passed vertically through the stack of frames so as to produce a network in which the strands extend in each of three mutually perpendicular directions. The resulting three-dimensional network is then immersed in a bath of matrix material such as polyurethane foam before the material has foamed, cured or otherwise hardened. After the matrix material has hardened, the frames are removed and there is obtained a block of structural material reinforced by a three-dimensional lattice of fibers. Such a block could be cut into panels or otherwise shaped as desired.

The passing of the fibers through the stack of frames, hereinafter called the Z fibers to denote their direction of orientation, was done with needles and was not readily adaptable to high production operations. The frames, rods and molds were reusable and had to be cleaned and reassembled between each block molded. A weaving machine for positioning the Z fiber in the X-Y array was slow and cumbersome and not readily adapted to high production operations, and the man hour expenditure per 3-D foam block could not be reduced to be competitive with other commercial cryogenic insulation systems.

There is a need for a more cost effective process for manufacturing thread reinforced foam insulation for commercial use such as for use in liquid methane marine carriers and storage vessels such as set forth, for example, in applicant's copending patent application Ser. No. 240,-362, filed Apr. 3, 1972 for "Cryogenic Storage Vessel."

SUMMARY OF THE PRESENT INVENTION

A new and improved method has been developed for fabricating three-dimensional reinforced foam insulation blocks that is readily adaptable to high production operations. In this process, frames of cardboard, plastic, or other discardable materials are used and are removed after the foaming process with a saw or cutter, thus eliminating time required for their cleaning for reuse. This scrap and discardable material may be recycled if desired but the cost of the materials is easily absorbed in the savings resulting from the man hour reduction. The X and Y frames are made by their insertion between layers of continuous fibers on a conveyor belt arrangement and held in place with an adhesive. The Z fibers are coated with a stiffening resin and inserted into the X-Y array with the assistance of a tubular guide frame. The frames holding the X, Y and Z array fibers becomes the mold for containing the matrix foam as the fibers are bound together to form a solid block of 3-D insulation.

DETAILED DESCRIPTION OF THE DRAWINGS

Figure 1:
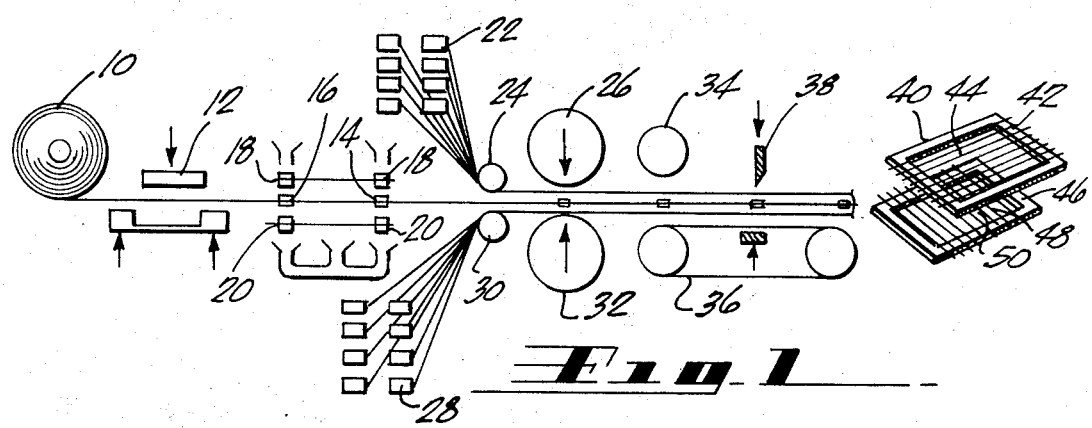
FIG. 1 is a schematic illustration of the steps in the making of the X-Y frames.

Reference is now made to FIG. 1 wherein is shown the sequence of steps in making the X-Y frames. Here there is shown a roll of corrugated cardboard 10 cut with a punch 12 to remove squares and leaving a boarder frame. The frames are not separated at this point and move along in a continuous strip. At the next station the upper and lower strips 14, 16 of the frame pass between upper and lower adhesive rollers 18, 20 prior to receiving fibers. At the next station fiber threads from approximately 65 spools 22 per foot of width in an upper tier pass under a roller 24 and under a pressure roller 26. Fiber threads from another array of 65 spools 28 per foot of width pass over roller 30 and over pressure roller 28. These threads are pressed against the upper and lower surfaces of cardboard strips 16, 18. Roller 30 and conveyor belt 32 keep the frames moving until the fibers and frame are cut by cutter 34. The frames are then stacked with the fibers running alternately in an X direction and Y direction, as shown by frames 40 having fibers 42 stretched across opening 44 and frame 46 with fibers 48 over opening 50 at right angles to the fibers 42 of frame 40. With the exception of being rotated 90°, the X frames and Y frames are identical.

Figure 2:
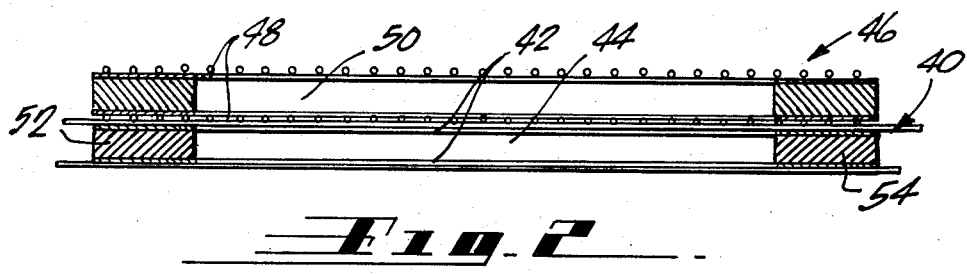
FIG. 2 is a sectional view of a pair of stacked X-Y frames.

A sectional view of an X frame 40 and Y frame 46 is shown in FIG. 2. Here the X frame 40 has top and bottom fibers 42 stretched across between the lower cross strip 52 and upper cross strip 54, whereas with a 90° rotation, the Y frame 46 has the upper and lower fibers 48 stretched across its side strips over opening 50.

Figure 3:
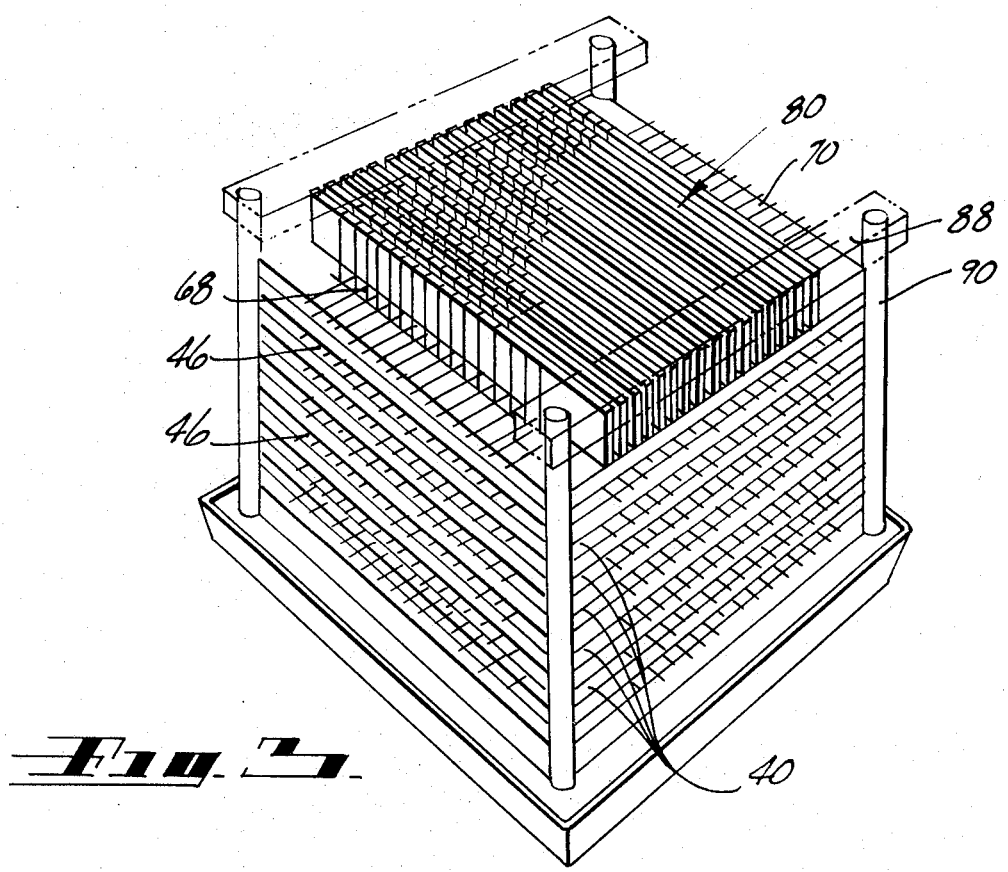
FIG. 3 shows the assembly of the X-Y and Z frames ready for the foaming operation.

A stack of such X and Y frames, 40 and 46, is shown in FIG. 3. The fibers are uniformly spaced at the rate of about 65 upper and 65 lower threads per foot across the opening of the frame. Also shown in FIG. 3 is the Z frame with the Z threads extending down into the X-Y matrix, the fabrication of which will be explained with reference to FIG. 4.

Figure 4:
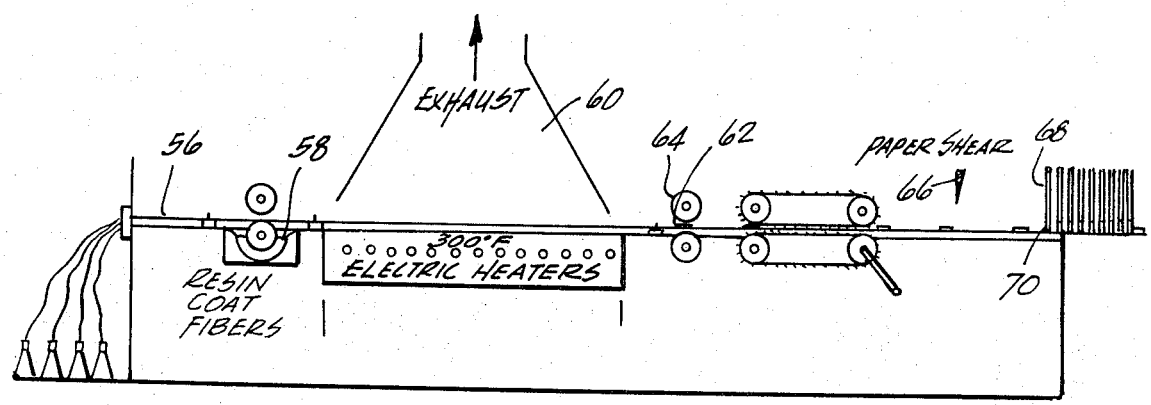
FIG. 4 is a schematic illustration of the steps involved in the making of the Z-stiffened fiber array.

The Z thread placement inside the X-Y stacked frames presents a greater problem than the making of the X-Y frames. The Z threads should be placed in the vertical square hole formed by alternating X and Y frames and should be spaced approximately .187 inch on center. One method is to use an X or Y frame of threads and dip the threads in an epoxy resin and cured to stiffen the threads. The frame is then cut in half and the stiff fibers are still held in place by one edge of the frame. Another method shown in FIG. 4 is to continually pass the threads 56 through a resin bath 58 and to cure them preferably at a temperature of 300° F. for approximately one minute in oven 60. Thereatfter, at spaced intervals, lateral strips 62 are pressed against the fibers such as by rollers 64 and then the threads are cut with the blade 66. This results in rigid fibers 68 connected at one end by a lateral strip 70. They are then stacked together to form an array for insertion into the X-Y matrix.

Figure 5:
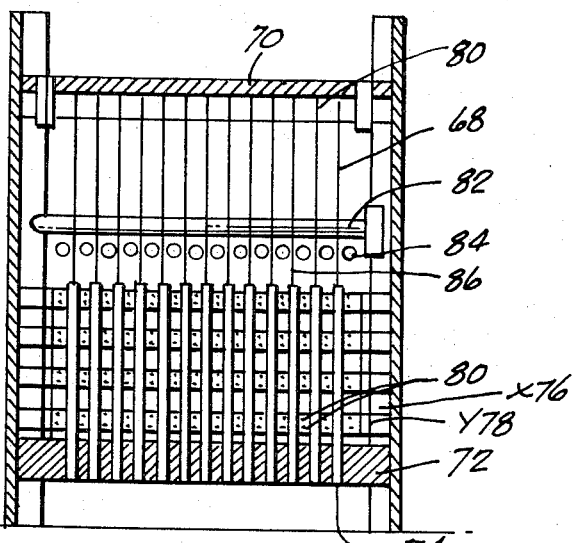
FIG. 5 is a schematic illustration of how the Z fibers are aligned and inserted into the X-Y array.

The insertion of the Z fibers into the matrix preferably may be done with a tube array base 72, shown in FIG. 5, having a plurality of spaced tubes 74 extending upwardly from the base and adapted to pass between the X-Y fibers in the square hole made thereby. As shown, an X frame 76 has threads 78 extending in one direction and Y frame 78 has threads 80 extending in another. A Z fiber array frame 80 comprising a plurality of Z strips 70 with the Z fibers 68 extending downwardly are then positioned by means of combs 82 and 84 which are passed along the fibers 68 from the top to near the bottom to thus properly position the Z fiber tips 86 in alignment over the tubes 74 into which they are then passed. When the Z fiber array frame 80 has then been moved downwardly and the Z fibers 68 have passed into the tubes 74, the tube array base 72 is then withdrawn leaving the Z fibers extending vertically through the X-Y matrix. This position is shown in FIG. 3 with the Z strips 70 still in position. Appropriate clamping means such as horizontal members 88 secured to vertical members 90 maintain the X, Y and Z frames securely in position and ready for the foaming operation.

Figure 6:
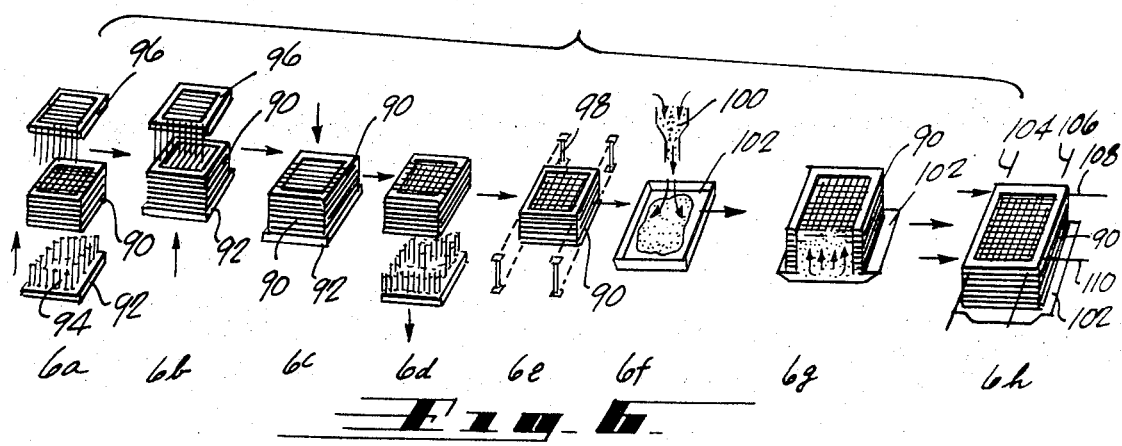
FIG. 6 (FIGS. 6a to 6h) is a schematic illustration of the steps involved from the insertion of the Z fibers until the finished 3-D foam composite block has been freed from the discardable frames.

The sequence of events from the installation of the Z fibers in the X-Y matrix to the removal of the X-Y frames, is shown in FIG. 6. Here there is shown in FIG. 6a the X-Y matrix 90 with the tube array base 92 positioned below, ready for upward insertion of its tubes 94 into the X-Y matrix. Positioned overhead is the Z fiber array 96. In FIG. 6b, the tube array base 92 has already been moved upwardly and the Z fiber array remains positioned over the X-Y matrix. In FIG. 6c, the Z fiber array 90 has been lowered so that the fibers will pass through the tubes in the tube array base. In FIG. 6d the tube array base has been removed and in FIG. 6e appropriate fastening devices 98 hold the composite to serve as a mold. In FIG. 6f is shown the step of releasing a plastic foam mixture 100 into an appropriate tray 102 after which, as shown in FIG. 6g, the composite mold is positioned over the mixture in the tray so that the mixture can foam up through, around and encompass the X, Y, Z fibers. Since the Z fibers are suspended from the top only, there is no extraneous structure or restriction at the bottom to impede the rise of the foam up through the X, Y, Z array. This permits a lower density foam block to be achieved, reducing the cost of materials and improving its insulation quality. In FIG. 6h there is shown lines 104, 106, 108 and 110 defining vertical planes through which a cutting instrument will pass in freeing the finished reinforced block from its fiber holding frames and discardable mold.

Having thus described an illustrative embodiment of the present invention, it is to be understood that modfications thereof will become apparent to those skilled in the art and it is to be understood that these deviations are to be construed as part of the present invention.

I claim:
1. In the fabrication of reinforced insulation blocks, the steps of:
  (1) making multiple sets of X-Y frames wherein the X frames have substantially parallel uniformly spaced threads attached thereto which extend in an X direction, and wherein the Y frames have substantially parallel uniformly spaced threads attached thereto which extend in a Y direction, said X and Y directions being substantially relatively perpendicular,
  (2) stacking the X and Y frames so that some of said threads are perpendicular to others to form a stack of X-Y grids of threads,
  (3) stiffening and inserting into the openings of said grids a multiple of threads in a Z direction normal to the planes of said X and Y frames, said stiffening being to facilitate their insertion through said grids and to maintain their position during subsequent foaming operations,
  (4) immersing said arrangement of threads in a foamable, solidifiable insulation material and allowing said materal to harden, and
  (5) removing said frames from said threads embedded in said foam material,

2. In the fabrication of reinforced insulation blocks as in claim 1, the steps of:
  inserting tubes through said grids to form pathways for inserting therethrough said threads in the Z direction, and
  removing said tubes after said threads have been inserted therein to thereby provide Z threads through said grids.

3. In the fabrication of reinforced insulation blocks as in claim 2, the step of:
  passing combs through said Z threads to align them for passage through said tubes.

4. In the fabrication of reinforced insulation blocks as in claim 1, the step of:
  passing combs through said Z threads to align them for passage through openings in said grids.

References Cited
UNITED STATES PATENTS

| | | | |
|---|---|---|---|
| 3,322,868 | 5/1967 | Kruse et al. | 264—45 |
| 3,523,989 | 8/1970 | Murer | 264—54 X |
| 1,713,679 | 5/1929 | Snelling | 264—Dig. 44 X |
| 2,762,739 | 9/1956 | Weiss | 154—90 |
| 3,289,703 | 12/1966 | Brown | 138—125 |
| 2,964,442 | 12/1960 | Hansen | 264—45 X |
| 3,187,069 | 6/1965 | Pincus et al. | 264—45 |
| 3,270,103 | 8/1966 | Kurtz | 264—45 |
| 3,305,991 | 2/1967 | Weismann | 52—309 |
| 3,439,087 | 4/1969 | Ledeen | 264—255 |
| 3,466,822 | 9/1969 | Hall et al. | 52—223 |

HOSEA E. TAYLOR, Primary Examiner

H. S. COCKERAM, Assistant Examiner

U.S. Cl. X.R.

156—296; 161—144; 264—158, DIG. 23, DIG. 63